US011554962B2

(12) United States Patent
Min et al.

(10) Patent No.: US 11,554,962 B2
(45) Date of Patent: Jan. 17, 2023

(54) METHOD FOR PRODUCING SILICA AEROGEL BLANKET AND APPARATUS FOR PRODUCING SAME

(71) Applicant: LG CHEM, LTD., Seoul (KR)

(72) Inventors: Kyung Seok Min, Daejeon (KR); Je Kyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 49 days.

(21) Appl. No.: 16/627,564

(22) PCT Filed: Aug. 21, 2018

(86) PCT No.: PCT/KR2018/009614
§ 371 (c)(1),
(2) Date: Dec. 30, 2019

(87) PCT Pub. No.: WO2019/039841
PCT Pub. Date: Feb. 28, 2019

(65) Prior Publication Data
US 2020/0216322 A1 Jul. 9, 2020

(30) Foreign Application Priority Data
Aug. 24, 2017 (KR) .......................... 10-2017-0107467

(51) Int. Cl.
*C01B 33/152* (2006.01)
*C01B 33/146* (2006.01)
*B05D 1/18* (2006.01)

(52) U.S. Cl.
CPC .............. *C01B 33/152* (2013.01); *B05D 1/18* (2013.01); *C01B 33/146* (2013.01)

(58) Field of Classification Search
CPC ....... B05D 1/18; C01B 33/152; C01B 33/146; B01J 19/22; C01P 2006/40;
(Continued)

(56) References Cited

U.S. PATENT DOCUMENTS 3,895,087 A 7/1975 Ottinger et al.
4,158,297 A * 6/1979 Winch .................. D06B 3/201
68/22 R
(Continued)

FOREIGN PATENT DOCUMENTS

CN 103011745 4/2013
CN 2016-0039509 A 4/2016
(Continued)

*Primary Examiner* — Katherine A Bareford
(74) *Attorney, Agent, or Firm* — Morgan, Lewis & Bockius LLP (57) ABSTRACT

Provided is a method for producing a silica aerogel blanket and an apparatus for producing the same, which are capable of easily controlling the physical properties of a silica aerogel blanket by separately injecting silica sol and a gelation catalyst to control gelation time, improving aerogel pore structure to be uniform and improving thermal insulation performance by sufficiently and uniformly impregnating the silica sol and the gelation catalyst into a blanket, reducing the loss of silica sol and gelation catalyst by allowing the silica sol and the gelation catalyst to pass on an ascending slope before gelation to remove any excessive silica sol and gelation catalyst exceeding an appropriate impregnation amount, and providing a silica aerogel blanket having less process trouble, and less dust.

12 Claims, 5 Drawing Sheets

(58) Field of Classification Search
CPC .............. C01P 2006/11; C01P 2006/17; C01P 2004/04; C01P 2004/02; C01P 2004/03
See application file for complete search history.

(56) References Cited

U.S. PATENT DOCUMENTS

| | | | | |
|---|---|---|---|---|
| 6,524,680 | B1* | 2/2003 | Tanaka | F01N 3/2803 428/116 |
| 9,476,123 | B2 | 10/2016 | Gould et al. | |
| 10,112,796 | B2 | 10/2018 | Kim et al. | |
| 2005/0046086 | A1* | 3/2005 | Lee | B01J 13/0091 264/444 |
| 2015/0239001 | A1* | 8/2015 | Tsai | H01L 31/1828 438/57 |
| 2016/0060808 | A1* | 3/2016 | Oikawa | D06M 13/513 442/63 |
| 2016/0375464 | A1* | 12/2016 | Gould | B29C 39/003 427/398.1 |
| 2017/0309409 | A1 | 10/2017 | Kim et al. | |
| 2018/0086587 | A1* | 3/2018 | Kim | C01B 33/1585 |
| 2018/0161744 | A1 | 6/2018 | Kim et al. | |

FOREIGN PATENT DOCUMENTS

| | | |
|---|---|---|
| CN | 106810139 A | 6/2017 |
| JP | 2011190136 | 9/2011 |
| JP | 2011190551 | 9/2011 |
| KR | 2013-0032676 A | 4/2013 |
| KR | 10-1329087 | 11/2013 |
| KR | 10-20150093063 | 8/2015 |
| KR | 10-1555573 | 9/2015 |
| KR | 2016-0039509 A | 4/2016 |
| KR | 10-1660116 | 9/2016 |
| KR | 10-1748532 | 6/2017 |
| WO | 2017-126784 | 7/2017 |
| WO | 2017-126870 | 7/2017 |

* cited by examiner

METHOD FOR PRODUCING SILICA AEROGEL BLANKET AND APPARATUS FOR PRODUCING SAME

CROSS-REFERENCE TO RELATED APPLICATIONS

This application is a National Stage Application of International Application No. PCT/KR2018/009614 filed on Aug. 21, 2018, which claims the benefit of Korean Patent Application No. 10-2017-0107467, filed on Aug. 24, 2017, in the Korean Intellectual Property Office, the disclosure of which is incorporated herein in its entirety by reference.

TECHNICAL FIELD

The present invention relates to a method for producing a silica aerogel blanket and an apparatus for producing the same.

BACKGROUND ART

Aerogel is a superporous, high specific surface area (500 m$^2$/g) material having a porosity of about 90-99.9% and a pore size in the range of 1-100 nm, and is a material excellent in ultra-light weight, super thermal insulation, ultra-low dielectric, and the like. Accordingly, research on the development of aerogel materials as well as research on the practical use thereof as transparent insulation materials, environmentally friendly high temperature insulation materials, ultra-low dielectric thin films for highly integrated devices, catalysts and catalyst carriers, electrodes for supercapacitors, and electrode materials for seawater desalination have been actively studied.

The biggest advantage of aerogel is that aerogel has a super-insulation exhibiting a thermal conductivity of 0.03 W/mK or less, which is lower than that of an organic insulation material such as conventional Styrofoam, and that fire vulnerability and the occurrence of harmful gases in case of fire which are fatal weaknesses of the organic insulation material can be solved.

In a typical method for producing a silica aerogel-containing blanket, a solution obtained by mixing a silica precursor sol and a gelation catalyst in a gel casting process is impregnated into a fiber to produce a silica aerogel-containing blanket. Therefore, there are disadvantages in that when the silica precursor sol and the gelation catalyst are mixed, a sol-gel chemical reaction immediately starts and the viscosity of the mixed solution is increased allowing particles to form before sufficient impregnation into the fiber is achieved, so that it is difficult to control the gelation rate, and the gelled aerogel is damaged or lost during a process, so that the insulation performance of a final product is deteriorated.

In addition, when the precursor sol and the gelation catalyst are injected onto a moving element as in a Roll-to-Roll process, the precursor sol and the gelation catalyst are not sufficiently impregnated into a fibrous blanket located on the moving element, allowing uneven impregnation to occur on the surface of the blanket, thereby deteriorating the insulation performance thereof. When an injection amount of the precursor sol and the gelation catalyst is increased in order to prevent such a problem, the amount that can be impregnated into the fibrous blanket is exceeded, and the precursor sol and gelation catalyst exceeding the impregnation amount may overflow from the moving element, resulting in process loss. Furthermore, a solid, such as powder, is formed due to a subsequent gelation of the overflown mixture, which causes a problem of acting as a process trouble factor for a mechanically operating processing device.

Therefore, the inventors of the present invention have developed the present invention after conducting studies in order to solve such typical problems.

PRIOR ART DOCUMENT (Patent Document 1) U.S. Pat. No. 9,476,123 B2 (Oct. 25, 2016)

DISCLOSURE OF THE INVENTION

Technical Problem

An aspect of the present invention provides a production method capable of producing a silica aerogel blanket having a uniform pore structure and uniform and excellent thermal insulation performance by uniformly impregnating silica sol and a gelation catalyst into a fibrous blanket and controlling the injection rate of the silica sol and the gelation catalyst.

Another aspect of the present invention provides a production method capable of reducing the loss of silica sol and gelation catalyst, reducing process trouble, reducing dust, and furthermore, maximizing operation stability through managing solvent vapor and maximizing economic feasibility through reducing solvent loss.

Another aspect of the present invention provides an apparatus for producing a silica aerogel blanket capable of producing the silica aerogel blanket.

Technical Solution

According to an aspect of the present invention, provided is a method for producing a silica aerogel blanket, the method including 1) separately injecting silica sol and a gelation catalyst into an impregnation tank in which a blanket is present;

2) impregnating the blanket with the silica sol and the gelation catalyst separately injected into the impregnation tank;

3) transferring the blanket impregnated with the silica sol and the gelation catalyst to a moving element through an ascending slope; and 4) gelling the impregnated blanket on the moving element.

According to another aspect of the present invention, provided is an apparatus for producing a silica aerogel blanket, the apparatus comprising: an impregnation tank in which a blanket is impregnated with silica sol and a gelation catalyst;

a blanket supply apparatus connected to one side of the impregnation tank and supplying a blanket;

a silica sol injection apparatus for injecting silica sol into the impregnation tank such that the supplied blanket is impregnated with the silica sol;

a gelation catalyst injection apparatus for injecting a gelation catalyst into the impregnation tank such that the supplied blanket is impregnated with the gelling catalyst;

an ascending slope connected to the other side of the impregnation tank and transferring the blanket impregnated with the silica sol and the gelation catalyst from the impregnation tank to a moving element; and a moving element connected to the ascending slope and on which the blanket impregnated with the silica sol and the gelation catalyst is gelled.

Advantageous Effects

A method for continuously producing a silica aerogel blanket and an apparatus for producing the same according to the present invention are capable of easily controlling the physical properties of a silica aerogel blanket by controlling gelation time, producing a silica aerogel blanket having a uniform aerogel pore structure and uniform and excellent thermal insulation performance, and reducing the loss of silica sol, gelation catalyst, and solvent during processing, thereby having an effect of reducing production costs, process trouble, and the generation of dust.

BRIEF DESCRIPTION OF THE DRAWINGS

The following drawings attached herein illustrate preferred embodiments of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to facilitate understanding of the present invention. In this case, it will be understood that words or terms used in the specification and claims shall not be interpreted as having the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The purpose of the present invention is to provide a method for producing a silica aerogel blanket and an apparatus for producing the same to solve problems of typical methods and apparatuses for producing a silica aerogel blanket, the problems such as the deterioration in thermal insulation performance due to uneven impregnation, the increase in raw material costs caused by the loss of raw materials such as silica sol and a gelation catalyst during processing, and the occurrence of process trouble and generation of dust in processing equipment due to gelation of an overflown solution of silica sol and a gelation catalyst.

Method for Producing Silica Aerogel Blanket

Figure 1:
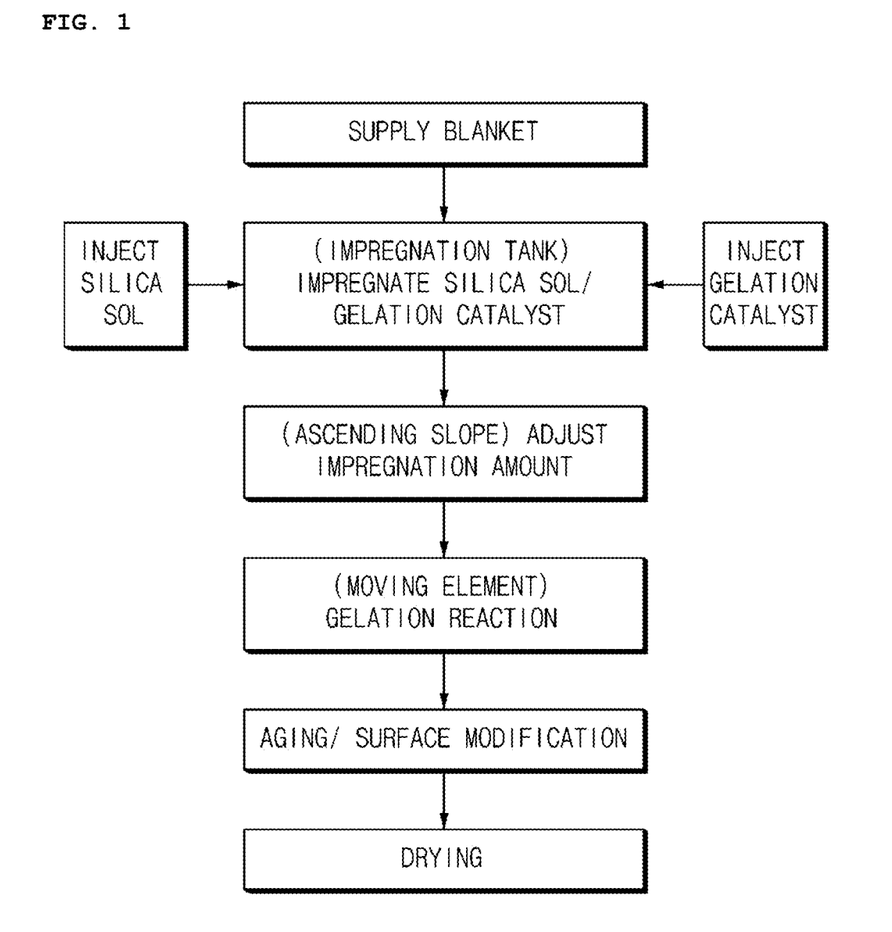
FIG. 1 is a schematic view showing a method for producing a silica aerogel blanket according to an embodiment of the present invention.

Specifically, as shown in FIG. 1, a method for producing a silica aerogel blanket of the present invention includes a method for producing a silica aerogel blanket, the method including 1) separately injecting silica sol and a gelation catalyst into an impregnation tank in which a blanket is present;

2) impregnating the blanket with the silica sol and the gelation catalyst separately injected into the impregnation tank;

3) transferring the blanket impregnated with the silica sol and the gelation catalyst to a moving element through an ascending slope; and 4) gelling the impregnated blanket on the moving element.

Hereinafter, a method for producing a silica aerogel blanket of the present invention will be described in more detail by each step.

Step 1)

The Step 1) of the present invention is characterized by separately injecting silica sol and a gelation catalyst into a blanket supplied by a blanket supply apparatus.

In a typical production method, a silica aerogel blanket is produced by impregnating a blanket with a mixed solution of silica sol and a gelation catalyst in a gel casting step. However, in this case, when the precursor sol and the gelation catalyst are mixed, a gelation reaction immediately starts and the viscosity of the mixed solution is increased, thereby allowing particles to form before sufficient impregnation into the fibrous fiber is achieved, so that it is difficult to control the gelation rate.

In addition, as a result, there arises problems in that the thickness of the silica aerogel blanket is not uniform, the gelled aerogel is damaged or lost during the transfer of the fibrous fiber or during processing, so that the insulation performance of a final product is deteriorated. Also, there arises problems in that aerogel particles are separated when the blanket is processed, such as cutting the blanket or bending the same, so that dust is generated and the durability of the blanket is deteriorated.

Accordingly, the present invention is characterized by separately injecting silica sol and a gelation catalyst by using a separate injection apparatus such that a gelation reaction occurs after sufficient impregnation into a blanket is achieved.

As in the production method of the present invention, when silica sol and a gelation catalyst are stored in a separate tank and are separately injected through a separate injection apparatus, the injection rate of each of the silica sol and the gelation catalyst is controllable through a separate control unit thereof, so that there is an effect in that it is possible to produce a silica aerogel blanket having desired physical properties according to the control of gelation time.

Meanwhile, according to an embodiment of the present invention, the silica sol and the gelation catalyst can be separately injected by various methods. The silica sol and the gelation catalyst can be injected to the top or bottom of the impregnation tank to which the blanket is supplied.

Specifically, the silica sol can be injected from the bottom of the impregnation tank, and the gelation catalyst can be injected from the top of the impregnation tank, separately. Alternatively, the silica sol can be injected from the top of the impregnation tank, and the gelation catalyst can be injected from the bottom of the impregnation tank, separately.

In this case, when compared with a case in which the silica sol and the gelation catalyst are injected in the same direction, the silica sol and the gelation catalyst may not be completely mixed. However, the impregnation of the silica sol and the gelation catalyst into the inside of the blanket can be complemented by a squeeze roller included in the impregnation tank, and since the silica sol and the gelation catalyst are mixed at the time of being impregnated into the blanket, it is possible to prevent viscosity increase before the impregnation and more precisely control physical properties according to the control of gelation time.

In addition, the silica sol and the gelation catalyst can be separately injected from the top of the impregnation tank. In this case, added with the pressurization by gravity, sufficient impregnation is ensured to the inner central portion of the blanket compared with the case in which the silica sol and the gelation catalyst are separately injected from the bottom of the impregnation tank, and compared with the case in which the silica sol and the gelation catalyst are separately injected from a different direction, a sufficient mixture is achieved to perform a uniform gelation reaction.

Meanwhile, the present invention is characterized in that silica sol and a gelation catalyst are separately injected, and thus is characterized in that gelation time and physical properties can be easily controlled by adjusting the injection direction, type, number, injection rate, distance between injection devices or from a blanket, and the like of the silica sol and the gelation catalyst.

According to an embodiment of the present invention, a precursor usable for the silica sol of the present invention can be an alkoxide-based compound containing silicon, specifically, a tetraalkyl silicate such as tetramethyl orthosilicate (TMOS), tetraethyl orthosilicate (TEOS), methyl triethyl orthosilicate, dimethyl diethyl orthosilicate tetrapropyl orthosilicate, tetraisopropyl orthosilicate, tetrabutyl orthosilicate, tetra secondary butyl orthosilicate, tetra tertiary butyl orthosilicate, tetrahexyl orthosilicate, tetracyclohexyl orthosilicate, and tetradodecyl orthosilicate. Among these, the silica precursor of the present invention can be, more specifically, tetramethyl orthosilicate (TMOS), tetraethyl orthosilicate (TEOS), or a mixture thereof.

As the gelation catalyst of the present invention, a base catalyst can be used, and the base catalyst serves to promote the gelation by increasing the pH of the silica sol.

The basic catalyst can be an inorganic base such as sodium hydroxide and potassium hydroxide; or an organic base such as ammonium hydroxide. However, in the case of an inorganic base, a metal ion included in a compound can be coordinated to a Si—OH compound. Thus, an organic base can be preferred. Specifically, the organic base can be ammonium hydroxide ($NH_4OH$), tetramethylammonium hydroxide (TMAH), tetraethyl ammonium hydroxide (TEAH), tetrapropyl-ammonium hydroxide (TPAH), tetrabutylammonium hydroxide (TBAH), methylamine, ethylamine, isopropylamine, mono-isopropylamine, diethylamine, diisopropylamine, dibutylamine, trimethylamine, triethylamine, triisopropylamine, tributylamine, choline, monoethanolamine, diethanolamine, 2-aminoethanol, 2-(ethylamino) ethanol, 2-(methylamino) ethanol, N-methyldiethanolamine, dimethyl aminoethanol, diethylaminoethanol, nitrilotriethanol, 2-(2-aminoethoxy)ethanol, 1-amino-2-propanol, triethanolamine, monopropanolamine, or dibutanol, and any one or a mixture of two or more thereof can be used. More specifically, the base of the present invention can be ammonium hydroxide ($NH_4OH$).

The base catalyst can be injected in an amount such that the pH of the silica sol is 4 to 8. When the pH of the silica sol is out of the above range, the gelation is not easily obtained, or the gelation rate is too slow, thereby deteriorating the processability. In addition, since the base can be precipitated when injected in a solid phase, it can be preferable to be added in the form of a solution diluted with the alcohol (polar organic solvent).

Meanwhile, the silica sol and the gelation catalyst can be a solution containing a polar organic solvent, and a solvent which can be used in the present invention can be an alcohol having 1 to 6 carbon atoms, specifically ethanol.

In addition, a blanket base which can be used in the present invention can be a film, a sheet, a net, a fiber, a porous body, a foam, a non-woven body, a glass fiber, a glass fiber mat, or a laminate of two or more layers thereof. In addition, according to the use, surface roughness can be formed or patterned on the surface thereof. More specifically, the blanket base can be a fiber capable of further improving the thermal insulation performance by including a space or a void through which silica aerogel can be easily inserted into the blanket base. Also, the blanket base can preferably have low thermal conductivity.

Specifically, the blanket base can be polyamide, polybenzimidazole, polyaramid, an acryl resin, a phenol resin, polyester, polyetheretherketone (PEEK), polyolefin (for example, polyethylene, polypropylene, or a copolymer thereof, and the like), cellulose, carbon, cotton, wool, hemp, a non-woven fabric, a glass fiber, or ceramic wool. More specifically, the blanket base can include a glass fiber or polyethylene.

Step 2)

The Step 2) of the present invention is characterized by impregnating the blanket with the silica sol and the gelation catalyst separately injected into the impregnation tank.

In a typical production method, silica sol and a gelation catalyst are injected on a moving element as in a Roll-to-Roll process, so that it is difficult to achieve sufficient impregnation into a fibrous blanket on the moving element. Thereby, non-uniform impregnation occurs on the surface of the blanket, and as a result, there is a problem in that the insulation performance of a produced blanket containing aerogel is deteriorated.

In addition, when an injection amount of the silica sol and the gelation catalyst is increased in order to prevent such a problem, the amount that can be impregnated into the fibrous blanket is exceeded, and the silica sol and gelation catalyst exceeding the impregnation amount may overflow from the moving element, resulting in process loss. Furthermore, a solid, such as powder, is formed due to a subsequent gelation of the overflown mixture, which causes a problem of acting as a process trouble factor for a mechanically operating processing device.

Therefore, in order to ensure that the sufficient impregnation of silica sol and a gelation catalyst into a blanket is achieved, in the present invention, the silica sol and the gelation catalyst are injected into an impregnation tank to ensure that the sufficient impregnation is achieved in the impregnation tank.

The present invention is characterized in that silica sol and a gelation catalyst can be separately injected in various manners as described above, and at the same time, is characterized in that the separate injection is performed in an impregnation tank. When separately injected on a moving element, silica sol and a gelation catalyst which have not yet mixed with each other to be subjected to gelation have a low viscosity, thereby overflowing from the moving element, resulting in the loss of raw materials. Therefore, the present invention attempts to solve the problem by separately injecting silica sol and a gelation catalyst on to a blanket present in an impregnation tank. In this case, when compared with a case in which silica sol and a gelation catalyst are separately injected on a moving element, the loss of raw materials are significantly reduced, thereby significantly reducing raw material costs.

Meanwhile, in this case, the injected rate and the like can be controlled to maintain the liquid level of the silica sol and the gelation catalyst in the impregnation tank of the present invention to overflow a little over the fibrous blanket, so that it is possible to secure uniform and excellent thermal insulation performance due to uniform impregnation.

According to an embodiment of the present invention, the residence time of a blanket the impregnation tank is 0.01 to 30 minutes, specifically 0.5 to 10 minutes, more specifically 0.1 to 5 minutes. In order to allow the blanket to stay in the impregnation tank for a period of time in the above range, the supply speed of a blanket supply apparatus can be appropriately adjusted.

When the blanket stays in the impregnation tank longer than the above period of time, processing time is increased so that productivity is decreased, or since a gelation reaction is performed starting from the impregnation tank, gelation of more than an impregnation amount occurs, resulting in the loss of silica sol and gelation catalyst. Furthermore, a solid, such as powder, is formed due to a subsequent gelation of a mixed solution without a blanket present on the impregnated blanket, which can become a process trouble factor for a mechanically operating processing device. When the blanket stays in the impregnation tank less than the above period of time, sufficient impregnation may not be achieved.

Step 3)

The Step 3) of the present invention is characterized by transferring the blanket impregnated with the silica sol and the gelation catalyst from the impregnation tank to a moving element through an ascending slope.

In a typical method, silica sol and a gelation catalyst present more than an impregnation amount exceeding the amount that can be impregnated on a fibrous blanket overflows from a moving element, resulting in process loss, so that economic feasibility is not good due to the increase in raw material costs.

In addition, gelled sol that has not been impregnated into the blanket and remaining on the impregnated blanket without a fibrous structure forms aerogel due to a subsequent gelation process. However, since there is no structural support, the aerogel is mechanically weak and separated from the blanket in a solid phase such as powder. The separated solid phase in a power form acts as a trouble factor, blocking lines and hindering pump operations in subsequent processes (aging, surface modification, and drying), and specifically, poses a danger in a supercritical drying process using high pressure processes. In addition, such powder acts as a major cause of dust generated in a processing process of an aerogel blanket product, making processability and workability poor.

Therefore, in the production method of the present invention, a blanket impregnated with silica sol and a gelation catalyst is transferred to a moving element through an ascending slope in an impregnation tank, so that an excessive amount of a mixed solution of the silica sol and the gelation catalyst flows down along the slope into the impregnation tank to prevent excessive impregnation, ensuring an appropriate level of impregnation (saturated impregnation). As a result, the durability and the thermal insulation of a product are improved, the loss of silica sol and a gelation catalyst which are raw materials is reduced, the number of emergency stopping is reduced, and the generation of dust is reduced, thereby solving typical problems.

In this case, as gravity is used, there is an advantage in that there is no separate energy supplied. To this end, it is necessary that the moving element of the present invention is located above the impregnation tank.

In addition, according to an embodiment of the present invention, the angle of the ascending slope is greater than 0° to less than 180°, preferably great than 1° to less than 90°, more preferably greater than 30° to less than 60° based on the bottom of the impregnation tank. In order to prevent excessive impregnation and to ensure an appropriate level of impregnation (saturated impregnation), it is necessary to maintain an appropriate angle of the ascending slope. When the angle of the ascending slope is less than the above range, the effects of preventing excessive impregnation and reducing the loss of raw materials may be insignificant. When the angle of the ascending slope is greater than the above range, the movement angle of the blanket is large so that the blanket is damaged or the workability of the blanket is deteriorated.

Step 4)

The Step 4) of the present invention is characterized by gelling the impregnated blanket on the moving element to produce a silica wet gel blanket.

In the present invention, sufficient impregnation is achieved in the impregnation tank, and a gelation reaction is performed after the silica sol and the gelation catalyst exceeding an appropriate impregnation amount is removed through the ascending slop, so that there is an effect of producing a silica aerogel blanket having desired physical properties by precisely controlling the gelation time according to the rate, temperature and length of the moving element.

Meanwhile, a blanket impregnated with silica sol and a gelation catalyst can be subjected to a gelation reaction while ascending on an ascending slope. However, the effect of the ascending slope is not reduced because the gelation reaction is performed on the ascending slope, rather, there can be the effect of the ascending slope is not reduced. Rather, there can be an effect of shortening the gelation time.

The gelation reaction can be one forming a network structure from a silica precursor material, and the network structure can be a planar mesh structure in which specific polygons having one or more types of atomic arrangement are linked to each other, or a structure in which specific polyhedrons share the vertices, edges, faces, and the like thereof with each other to form a three dimensional skeleton structure.

In addition, the purpose of the present invention is not only to reduce the loss of silica sol and a gelation catalyst, but also to enable solvent vapor management without deteriorating the quality of a final product or increasing gelation time.

Pores of silica gel are typically filled with a solvent derived from a solvent in which a silica gel precursor is polymerized. In general, a preferred solvent is a low molecular weight organic compound such as an alcohol having 1 to 6 carbon atoms, more preferably 1 to 4 carbon atoms. Other solvents which can be used include ethyl acetoacetate, acetone, dichloromethane, ether, and the like, but are not limited thereto.

However, due to a relatively high vapor pressure of a solvent (typically at room temperature), a considerable amount of solvent is evaporated, thereby causing various problems, such as solvent vapor release into the environment, exposure of workers to a highly concentrated solvent, fire risk due to highly concentrated flammable solvent vapor, overall low process efficiency and increased operation costs.

Specifically, liquid, in the present invention, the lowest temperature at which a solvent emits vapor having a concentration enough to form an ignitable mixture with air near a liquid surface is referred to as a 'flash point,' the temperature of most of the solvents at room temperature is above the flash point. For example, the flash point of ethanol and methanol at normal pressure is about 13° C. and about 11° C., respectively. Therefore, additional safety measures are required for gels prepared using such media. Such problems may be more problematic, for example, in a large-scale production facility in which a large aerogel blanket is produced in an open environment. For example, a silica wet gel blanket having a thickness of 1 mm or greater and an exposed surface area of several square feet can emit a large amount of solvent.

When 1) casting thicker gel, 2) casting gel with a large exposed surface or a large casting area, or 3) both, more or more highly concentrated solvent is expected to evaporate. Therefore, the present invention is applied to a blanket having a thickness of at least about 0.5 mm, 1 mm, and 2 mm or more, which is in contrast to a gel film which typically has a thickness in the micron range.

In general, a reduction in solvent vapor concentration can be achieved through 1) cooling a liquid solvent (that is, a solvent vapor supply source), 2) diluting solvent vapor with another gas (for example, $N_2$, argon, and the like), 3) air flow (for example, an exhaust fan) that delivers solvent vapor away from a solvent, or 4) a combination thereof. In addition, optionally, a casting apparatus or at least a portion thereof can be sealed to assist in solvent vapor management. In an embodiment of the present invention, the solvent vapor concentration can preferably be lower than the solvent vapor concentration of the flash point.

Therefore, the present invention can provide a method for producing a silica aerogel blanket, the method capable of improving operation stability and reducing the loss of solvent by reducing solvent vapor concentration near formed silica gel through solve vapor management, thereby increasing economic feasibility.

More specifically, gel is formed at a point in which a mixture containing a precursor exhibits resistance to flow and/or at the point in which a continuous polymer network is formed throughout the volume of the mixture. The reaction rate associated with the gel formation can greatly vary depending on factors such as reaction mechanism, concentration/chemical identity of components, and reaction conditions. In practice, without any limitation, a sol-gel reaction to form a gel material is considerably slowed down at low temperatures. In other words, gelation time is generally increased at low temperatures. For a particular production method, such as one including continuous gel production, a slow process may not be desirable since larger casting devices, more catalysts, and the like are required. In an embodiment of the present invention, solvent vapor concentration is reduced after a gel material is formed.

In an embodiment of the present invention, the present invention uses a gel casting method for a continuous or semi-continuous gel preparation method in which the formed gel is cooled. At lower temperatures, the vapor pressure of the solvent in the wet gel (silica gel blanket) is significantly reduced, enabling a more economical process and a safer working environment. Such economic benefit may be more pronounced when solvent recycling is required when considering other steps for recycling solvent vapor. Particularly at low temperatures, that is, below the flash point of the solvent, the combustion probability is greatly reduced and the safety of process operators is improved. Accordingly, in an embodiment of the present invention, a step of dispensing a gel precursor mixture at a predetermined rate such that the gel precursor mixture is gelled to form a silica wet gel blanket; and a step of cooling the prepared gel so as to reduce a solvent evaporation rate.

In order to cool the formed silica gel, cooling systems can be disposed on one side or multiple sides of the formed silica wet gel blanket. Optionally, a cooling system can be disposed by bypassing the silica wet gel composite. Specifically, the cooling system can cool the formed silica wet gel composite through any of 1) cooling the silica wet gel composite directly, 2) cooling the silica wet gel composite through a moving element, 3) cooling both the moving element and the silica wet gel composite, 4) cooling a precursor and a gelling catalyst respectively before injecting the same, or 5) cooling an impregnation tank, or a mixture in the impregnation tank.

In the present invention, the definition of the cooling is a decrease in the temperature of a solvent in gel. In an embodiment of the present invention, the silica wet gel blanket is cooled to a temperature below room temperature, below about 20° C., or from about 0° C. to about 20° C., including all individual values within the range.

The cooling system can be shaped to be suitable to receive a moving element while being sufficiently close to reduce the temperature of the silica wet gel blanket. The cooling can be performed by any heat transfer mechanism, such as conduction, convection, radiation, or a combination thereof. Preferably, the cooling system preferably aims to target only a region in which the silica wet gel blanket is formed.

In an embodiment of the present invention, as far as the design is concerned, the cooling system can be implemented in any form as long as it is capable of achieving the temperature of the range described above. The cooling system can be a container designed to receive a desired volume of coolant fluid, and the fluid can flow through the container or be fixed therein. In addition, optionally, the cooling system can be coupled to a slab, a housing, or a set of flow lines carrying a coolant. The flow line can be configured in a manner to cool a slab. In an embodiment, a simple winding pattern is used. In another form of the cooling system, gas stream can be delivered at a reduced temperature.

The method for producing a silica aerogel blanket of the present invention for solvent vapor management can be characterized in that:

the silica sol and the gelation catalyst are continuously injected at a first temperature at a predetermined rate sufficient to be gelled to produce a silica wet gel blanket having a thickness of at least 0.5 mm, the silica wet gel blanket is cooled at a second temperature on a moving element by a cooling system with non-physical contact, and the second temperature is lower than the first temperature.

In addition, as an embodiment, the method for producing a silica aerogel blanket of the present invention is characterized in that:

the silica sol and the gelation catalyst are continuously injected at a first temperature at a predetermined rate sufficient to be gelled to produce a silica wet gel blanket having a thickness of at least 0.5 mm, at least one side of the silica wet gel blanket is cooled at a second temperature, which is lower than the first temperature, on a moving element by a cooling system with non-physical contact, and at least the other side of the silica wet gel blanket composite is cooled at a third temperature, which is lower than the first temperature, on a moving element by a cooling system with non-physical contact.

As another embodiment, the method for producing a silica aerogel blanket of the present invention can characterized in that:

the silica sol and the gelation catalyst are continuously injected at a first temperature at a predetermined rate sufficient to be gelled to produce a silica wet gel blanket having a thickness of at least 0.5 mm, at least both sides of the silica wet gel blanket is cooled at a second temperature, which is lower than the first temperature, on a moving element by a cooling system with non-physical contact.

Specifically, the second temperature can be 20° C. or less, more specifically 0° C. to 20° C. In addition, a cooling medium used in the cooling system can be a fluid, a gas, or a mixture thereof.

Thereafter, the silica wet gel blanket of the present invention can be recovered in the form of a roll and further be subjected to aging, surface modification, and drying.

The aging is a process in which the silica wet gel composite is left at an appropriate temperature such that the chemical change thereof can be completely achieved. The aging can be performed by leaving the silica wet gel composite at a temperature of 50-90° C. for 1 to 10 hours in a solution in which a basic catalyst such as ammonia is diluted in an organic solvent at a concentration of 1-10%. By performing the aging step of the present invention, the formed network structure can be more firmly formed, and mechanical stability can be enhanced.

In addition, the dried silica aerogel maintains a low thermal conductivity just after drying, but absorbs water in the air due to the hydrophilicity of a silanol group (Si—OH) on the silica surface, so that there is a disadvantage in that the nanopore structure is shrunk due to the condensation reaction of the silanol group, thereby gradually increasing the thermal conductivity gradually. Therefore, in order to maintain a low thermal conductivity, there is a need to modify the surface of silica aerogel so as to be hydrophobic. Accordingly, a surface modification step for modifying the surface of silica aerogel surface by using a surface modifier can be additionally performed, and the surface modification of the present invention can be performed by adding one or more surface modifiers selected from the group consisting of trimethylchlorosilane (TMCS), hexamethyldisilazane (HMDS), methyltrimethoxysilane, trimethylethoxysilane, ethyltriethoxysilane, phenyltriethoxysilane, and polydimethylsiloxane, and more specifically, by adding hexamethyldisilazane (HMDS).

Thereafter, a hydrophobic silica aerogel can be produced through a drying process of removing a solvent while maintaining the pore structure of the hydrophobic silica gel, the surface of which has been modified. The drying process can be performed by an ambient drying process or a supercritical drying process.

The ambient drying process does not require high pressure reaction conditions and a special high pressure equipment for supercritical drying, so that the process thereof is simple and economical. However, since water or an organic solvent evaporates at a high temperature, when compared with supercritical drying, ambient drying has a problem in that the heat insulation performance is sharply reduced due to the occurrence of the destruction of the pore structure inside a gel. In addition, the above problem can be further exacerbated when drying is directly performed without the substitution with an organic solvent having a low surface tension.

In comparison, the drying of the present invention is capable of maximizing porosity by implementing supercritical drying, so that the heat insulation performance can be far superior to that of a silica gel produced by ambient drying.

Apparatus for Producing Silica Aerogel Blanket

Figure 2:
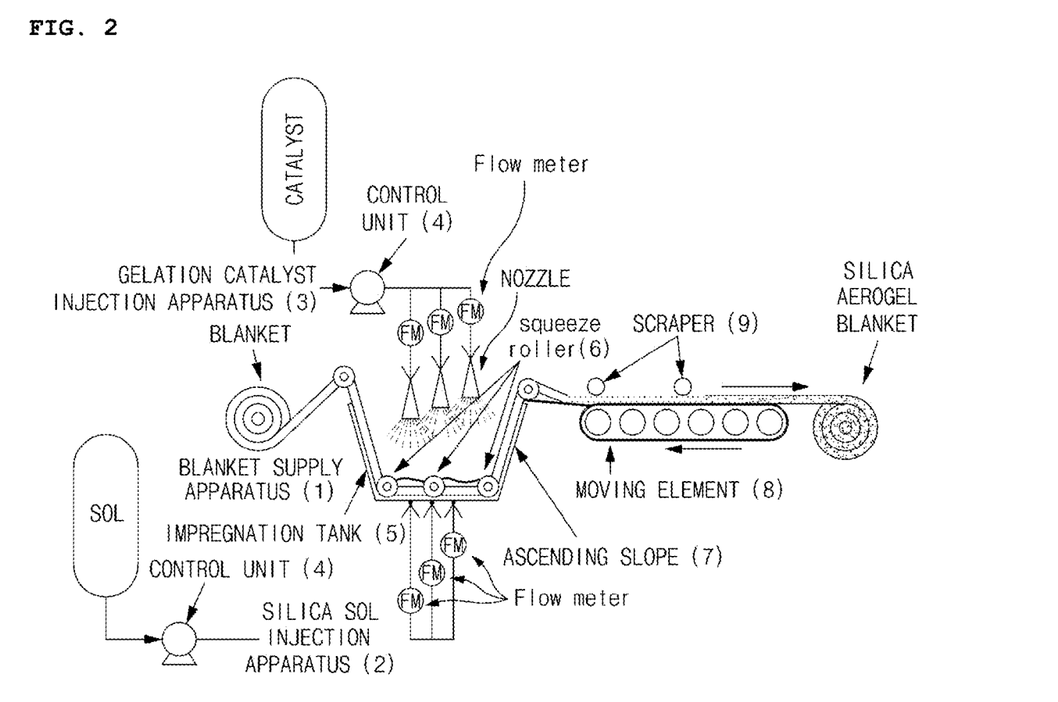
FIG. 2 is a stereoscopic view showing an apparatus for producing a silica aerogel blanket according to an embodiment of the present invention.
Figure 3:
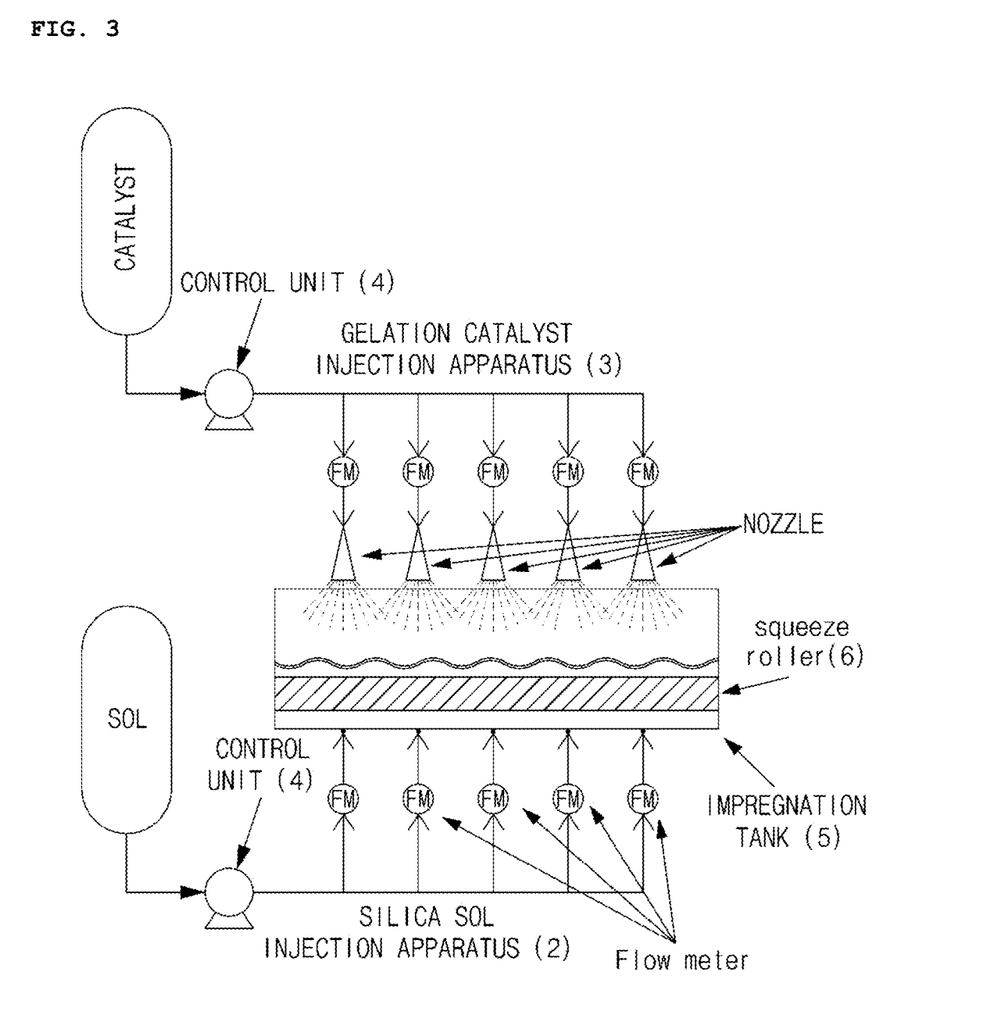
FIG. 3 is a detailed view showing in detail silica sol and gelation catalyst injection apparatuses and an impregnation tank of an apparatus for producing a silica aerogel blanket according to an embodiment of the present invention.

In addition, as shown in FIG. 2 and FIG. 3, the present invention provides an apparatus for producing a silica aerogel blanket which is capable of producing a silica aerogel blanket according to the method for producing a silica aerogel blanket of the present invention.

The apparatus for producing a silica aerogel blanket of the present invention is characterized by including an apparatus for producing a silica aerogel blanket, the apparatus comprising: an impregnation tank in which a blanket is impregnated with silica sol and a gelation catalyst;

a blanket supply apparatus connected to one side of the impregnation tank and supplying a blanket;

a silica sol injection apparatus for injecting silica sol into the impregnation tank such that the supplied blanket is impregnated with the silica sol;

a gelation catalyst injection apparatus for injecting a gelation catalyst into the impregnation tank such that the supplied blanket is impregnated with the gelling catalyst;

an ascending slope connected to the other side of the impregnation tank and transferring the blanket impregnated with the silica sol and the gelation catalyst from the impregnation tank to a moving element; and a moving element connected to the ascending slope and on which the blanket impregnated with the silica sol and the gelation catalyst is gelled.

Specifically, according to an apparatus according to an embodiment of the present invention, silica sol and a gelation catalyst are stored in a separate tank, and the silica sol is injected through a silica sol injection apparatus (2) and the gelation catalyst is injected through a gelation catalyst injection apparatus (3), separately. Specifically, the silica sol and the gelation catalyst are introduced into several flow meters to be sprayed through nozzles onto a blanket supplied to an impregnation tank (5), and each injection rate is controlled by a control device (4) connected to each tank.

Meanwhile, the fibrous blanket is wound in the form of a roll and supplied to the impregnation tank (5) at a constant rate by a blanket supply device (1). The sprayed silica sol and the gelation catalyst are mixed with the blanket while being impregnated thereinto in the impregnation tank (5). The liquid level of the mixed solution of the silica sol and the gelation catalyst sprayed onto the impregnation tank (5) is maintained to overflow a little over the fibrous blanket, so that uniform impregnation is achieved. In the impregnation tank (5), one or more squeeze rollers (6) are additionally present to induce the mixture and uniform impregnation of the silica sol and the gelation catalyst into the inside of the blanket.

The blanket stays in the impregnation tank (5) for a predetermined period of time such that sufficient and uniform impregnation is achieved, and is transferred along an ascending slope (7), so that an excessive amount of the mixed solution of the silica sol and the gelation catalyst flows down along the slope into the impregnation tank to prevent excessive impregnation, ensuring an appropriate level of impregnation (saturated impregnation).

Thereafter, the transferred from the ascending slope (7) is transferred to a moving element (8), and a gelation reaction occurs on the moving element (8) to produce a silica wet gel blanket. A scraper (9) additionally present on the moving element (8) adjusts the thickness of the blanket, so that the thickness of the silica aerogel blanket prepared in the production apparatus of the present invention can be uniformly controlled.

Although not illustrated in the drawings, after the gelation reaction is completed, the silica wet gel blanket can be recovered in the form of a moving element or a roll, and then additionally subjected to aging, surface modification and then drying in a separate container to finally produce a silica aerogel blanket.

Hereinafter, examples of the present invention will be described in detail so that those skilled in the art can easily carry out the present invention. The present invention can, however, be embodied in many different forms and is not limited to the examples set forth herein.

Example 1

As a silica precursor, 9 kg of hydrolyzed TEOS was mixed with 27 kg of ethanol to prepare 32.5 L of silica sol (Target density (TD) 40 kg/m$^3$). Separately, 40.2 kg of ethanol and 0.35 kg of NH$_4$OH (30% aqueous solution) were mixed to prepare a gelation catalyst solution. The silica sol was introduced into an impregnation tank before a gel casting apparatus at a constant flow rate of 1.2 L/min, and a polyester fiber (glass fiber mat) passing at a constant speed was impregnated into the impregnation tank. The gelation catalyst solution was injected at 0.12 L/min onto the sol-impregnated fiber and the impregnation tank. The fiber mat impregnated with the silica sol and the gelation catalyst in the impregnation tank was then elevated upward along a slope, and while passing over a conveyor belt at a constant speed, gelation was performed thereon. The gelation was performed for 10 minutes, and after the gelation was completed, the gelled fiber mat was stabilized for 10 minutes at room temperature (25° C.), and followed by pre-aging in an oven at 70° C. for 50 minutes. The mixture of ethanol and NH$_4$OH (volume ratio of 98:2) was prepared to be added to a resulting reaction mixture in an amount of 1.6 times of the volume of silica sol, and then aging was performed in an oven at 70° C. for 1 hour, followed by surface modification using hexamethyldisilazane. After the surface modification was completed, a silica gel-fiber composite was placed into a supercritical extractor of 7.2 L and CO$_2$ was continuously injected thereto at 28° C. and 70 bar for 10 minutes at a rate of 70 L/min. Thereafter, the temperature inside the extractor was raised to 50° C. over 1 hour and 20 minutes, and upon reaching 50° C. and 150 bar, CO$_2$ was continuously injected thereto for 20 minutes at a rate of 5 L/min. At this time, ethanol was recovered through a lower end of a separator. After 20 minutes of resting, supercritical drying was performed by continuously injecting CO$_2$ at a rate of 5 L/min over 20 minutes. Thereafter, CO$_2$ was vented over 2 hours to produce a silica aerogel blanket.

Examples 2 to 4

A silica aerogel blanket was produced in the same manner as in Example 1 except that 32.5 L of silica sol (TD=60 kg/m$^3$, 80 kg/m$^3$, 100 kg/m$^3$) and a gelation catalyst solution were added at 0.06, 0.048, 0.041 L/min respectively, as shown in Table 1 below.

Comparative Example 1

As a silica precursor, 9.9 kg of hydrolyzed TEOS was mixed with 27 kg of ethanol to prepare 32.5 L of silica sol (Target density (TD) 40 kg/m$^3$). Separately, 4.2 kg of ethanol and 0.35 kg of NH$_4$OH (30% aqueous solution) were mixed to prepare a gelation catalyst solution, and the prepared gelation catalyst solution was added with the silica sol. Without an impregnation tank, a polyester fiber (glass fiber mat) passing a conveyor belt at a constant speed was introduced thereto, that is, onto a gel casting apparatus at a constant flow rate of 1.32 L/min to be impregnated, followed gelation for 10 minutes. After the gelation, a silica aerogel blanket was produced in the same manner as in Example 1.

Experimental Example 1: Measurement of Aerogel Content in Blanket and Thermal Conductivity The content of aerogel contained in the silica aerogel blankets produced in Examples 1 to 4 and Comparative Example 1 were measured by subtracting the initial blanket fiber weight from the weight of the produced aerogel blanket, and as for thermal conductivity, high temperature thermal conductivity was measured using GHP 456 of NETZSCH Co. The results are shown in Table 1 below.

TABLE 1

| | Target density (kg/m$^3$) | Catalyst injection rate (L/min) | Content of aerogel in silica aerogel blanket (wt %) | Thermal conductivity (mW/mK) |
|---|---|---|---|---|
| Example 1 | 40 | 0.120 | 30 | 14.5 |
| Example 2 | 60 | 0.060 | 38 | 13.9 |
| Example 3 | 80 | 0.048 | 45 | 13.3 |
| Example 4 | 100 | 0.041 | 55 | 13.0 |
| Comparative Example 1 | 40 | 0.120 (Mixed with sol and then injected) | 27 | 18.0 |

Experimental Example 2: Dust Generation Experiment

The silica aerogel blankets produced in Example 1 and Comparative Example 1 were cut to a size of 600×900 mm$^2$, and vibrated for 6 hours at 12 Hz to measure the weight change of silica aerogel blanket before/after the vibration. The results are shown in Table 2 below.

TABLE 2

| | Before vibration (g) | After vibration (g) | Weight change (g) | Increase/decrease rate (%) |
|---|---|---|---|---|
| Example 1 | 1035 | 1030 | <5 | <−0.5% |
| Comparative Example 1 | 1035 | 1019 | 16 | −1.5% |

As shown in Table 2, the silica aerogel blanket of Example 1 produced by the production method of the present invention has a significantly small amount of dust when compared with that of Comparative Example 1.

This is due to performing impregnation in an impregnation apparatus such that the silica sol and the gelation catalyst are uniformly and sufficiently impregnated into the blanket, and allowing the blanket to be transferred from the impregnation apparatus to the moving element through the ascending slope such that an excessive amount of silica sol and gelation catalyst flows down to the bottom of the impregnation apparatus so as to prevent the formation of aerogel formed without a fibrous blanket structure.

Experimental Example 3: Scanning Electron Microscope (SEM) Photograph

Figure 4:
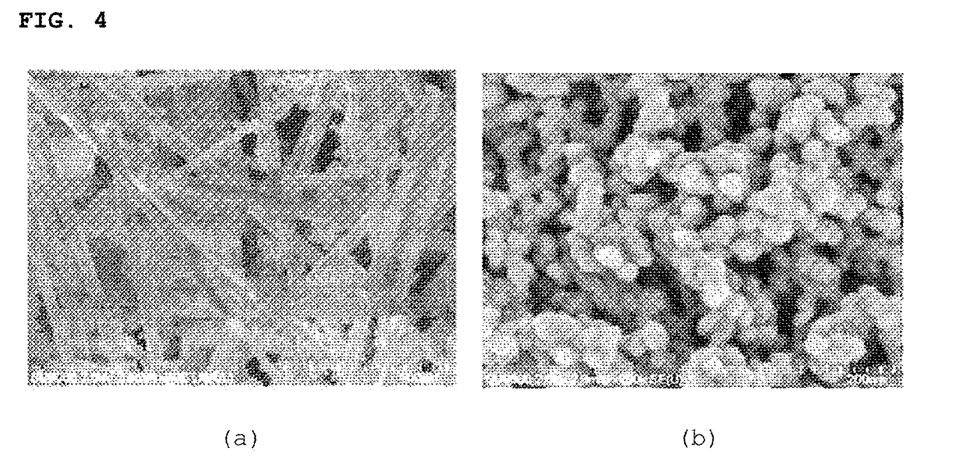
FIG. 4 is a SEM photograph (scale=(a) 100 um, (b) 200 nm) of a silica aerogel blanket prepared according to Example and Comparative Example of the present invention.

An SEM photograph of each of the silica aerogel blankets produced in Example 1 and Comparative Example 1 was taken and is shown in FIG. 4.

As shown in FIG. 4, the silica aerogel blanket of Example 1 produced by the production method of the present invention has silica aerogel uniformly combined between the fibrous fiber when compared with that of Comparative Example 1.

Experimental Example 4: Thermal Imaging Camera Photograph

The silica aerogel blankets produced in Example 1 and Comparative Example 1 were wrapped around a pipe of −175° C., and the thermal imaging camera photographs thereof were taken using FLIR T62101 equipment of FLIR Co. The results are shown in FIG. 5.

Figure 5:
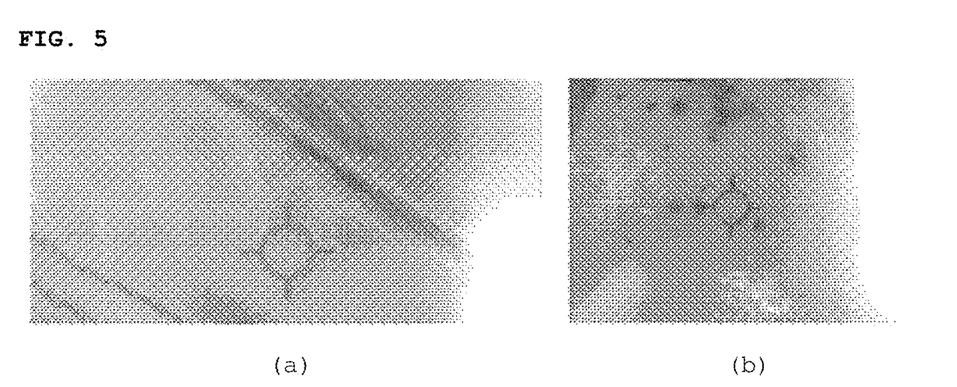
FIG. 5 is a thermal imaging camera photograph of a silica aerogel blanket prepared according to Example and Comparative Example of the present invention.

As shown in FIG. 5, the silica aerogel blanket of Example 1 produced by the production method of the present invention has uniform thermal insulation performance when compared with that of Comparative Example 1.

Experimental Example 5: Measurement of Pore Size Distribution of Aerogel

Figure 6:
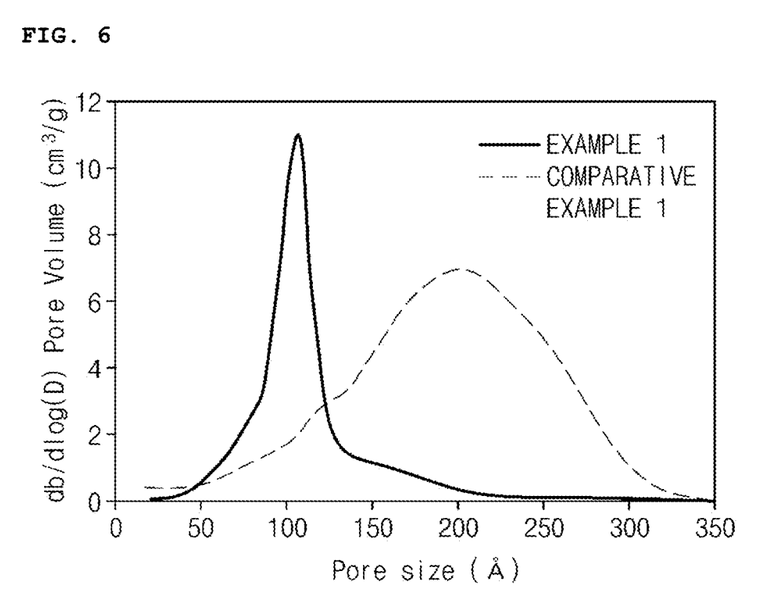
FIG. 6 is a graph showing the pore size distribution of a silica aerogel blanket prepared according to Example and Comparative Example of the present invention.

The pore size distribution of silica aerogel of silica aerogel blankets produced in Example 1 and Comparative Example 1 was measured and the results are show in FIG. 6.

As shown in FIG. 6, the silica aerogel blanket of Example 1 produced by the production method of the present invention has uniform pore size distribution of silica aerogel when compared with that of Comparative Example 1.

The foregoing description of the present invention has been presented for purposes of illustration. It will be understood by those skilled in the art that various changes in form and details may be made therein without departing from the spirit and scope of the invention. It is therefore to be understood that the above-described embodiments are illustrative in all aspects and not restrictive.

DESCRIPTION OF SYMBOLS

1: Blanket supply apparatus
2: Silica sol injection apparatus (Silica sol injector)
3: Gelation catalyst injection apparatus (Gelation catalyst injector)
4: Control unit
5: Impregnation tank
6: Squeeze roller
7: Ascending slope
8: Moving element
9: Scraper

The invention claimed is:

1. A method for producing a silica aerogel blanket, the method comprising:
   1) Separately injecting silica sol and a gelation catalyst into an impregnation tank in which a blanket is present;
   2) Impregnating the blanket with the silica sol and the gelation catalyst separately injected into the impregnation tank, wherein a liquid level of the silica sol and the gelation catalyst in the impregnation tank is controlled to secure uniform impregnation;
   3) Transferring the blanket impregnated with the silica sol and the gelation catalyst to a moving element through an ascending slope; and
   4) Gelling the impregnated blanket on the moving element.

2. The method of claim 1, wherein the moving element is located above the impregnation tank.

3. The method of claim 1, wherein the silica sol is injected from the bottom of the impregnation tank and the gelation catalyst is injected from the top of the impregnation tank.

4. The method of claim 1, wherein the silica sol is injected from the top of the impregnation tank and the gelation catalyst is injected from the bottom of the impregnation tank.

5. The method of claim 1, wherein the silica sol and the gelation catalyst are separately injected from the top of the impregnation tank.

6. The method of claim 1, wherein the silica sol and the gelation catalyst are separately injected by one or more injections.

7. The method of claim 1, wherein the residence time of the blanket in the impregnation tank is 0.01 to 30 minutes.

8. The method of claim 1 further comprising inducing the impregnation of silica sol and a gelation catalyst into the blanket by a squeeze roller in the impregnation tank.

9. The method of claim 1, wherein the angle of the ascending slope is greater than 0° to less than 180°.

10. The method of claim 1, wherein the silica sol and the gelation catalyst are continuously injected at a first temperature to produce a silica wet gel blanket having a thickness of at least 0.5 mm, the silica wet gel blanket is cooled by placing at a second temperature on the moving element, and the second temperature is lower than the first temperature.

11. The method of claim 1, wherein the residence time of the blanket in the impregnation tank is 0.5 to 10 minutes.

12. The method of claim 1, wherein the residence time of the blanket in the impregnation tank is 0.1 to 5 minutes.

* * * * *